United States Patent [19]

Matsuura et al.

[11] Patent Number: 4,904,630
[45] Date of Patent: Feb. 27, 1990

[54] CATALYST FOR OLEFIN POLYMERIZATION

[75] Inventors: Mitsuyuki Matsuura; Takashi Fujita, both of Yokkaichi, Japan

[73] Assignee: Mitsubishi Petrochemical Company Ltd., Tokyo, Japan

[21] Appl. No.: 217,983

[22] Filed: Jul. 12, 1988

[30] Foreign Application Priority Data

Jul. 13, 1987 [JP] Japan ................................ 62-174260
Jul. 22, 1987 [JP] Japan ................................ 62-182720

[51] Int. Cl.$^4$ ................................................ C08F 4/64
[52] U.S. Cl. ...................................... 502/119; 502/108; 502/123; 502/124; 502/125; 502/126; 502/127; 526/125; 526/119
[58] Field of Search .............. 502/108, 119, 115, 116, 502/123, 124, 125, 126, 127

[56] References Cited

U.S. PATENT DOCUMENTS 4,780,443 10/1988 Matsuura et al. .................. 502/119

Primary Examiner—Patrick P. Garvin
Attorney, Agent, or Firm—Oblon, Spivak, McClelland, Maier & Neustadt

[57] ABSTRACT

A catalyst for olefin polymerization which comprises: Component (A) which is a solid catalyst component obtained by contacting the following components (i) to (iv):

(i) a solid component comprising titanium, magnesium and halogen as essential elements, (ii) a silicon compound represented by the formula (I):

$$R^1_m X_n Si(OR^2)_{4-m-n} \qquad (I)$$

wherein $R^1$ and $R^2$ each represent a hydrocarbon residue, X represents a halogen, and each of m and n is an integer in the range of $0 \leq m \leq 3$, $0 \leq n \leq 3$, and $0 \leq m+n \leq 3$, (iii) a titanium compound or a silicon compound represented by the formula (II) or (III):

$$Ti(OR^3)_{4-l}X_l \qquad (II)$$

$$R^4_{4-l}SiX_l \qquad (III)$$

wherein $R^3$ represents a hydrocarbon residue, $R^4$ represents hydrogen or a hydrocarbon residue, X represents a halogen, and l is an integer in the range of $0 < l \leq 4$, and (iv) an organoaluminum compound; and Component (B) which is an organoaluminum compound.

16 Claims, No Drawings

CATALYST FOR OLEFIN POLYMERIZATION

BACKGROUND OF THE INVENTION

1. Field of the Art

This invention relates to a catalyst for olefin polymerization. More particularly, this invention relates to a catalyst which, when used for polymerization of olefins, especially α-olefins having 3 or more carbon atoms, makes it possible to produce polymers of high stereoregularity under stable polymerization conditions advantageously from the viewpoint of commercial production.

2. Background Art

Conventional catalysts for olefin polymerization comprising a solid catalyst component, which consists essentially of titanium, magnesium and a halogen, and an organoaluminum compound have a high catalytic activity. When using such catalysts, however, it is necessary to further use electron donative compounds during polymerization when polymer products are required to possess high stereoregularity. The use of an electron donative compound as a third component (outside electron donor) usually entails lowering of polymerization rate due to occurrence of a reaction between the electron donative compound and an organoaluminum compound. In this case, an attempt to enhance polymerization rate for an improved productivity by elevating polymerization temperature is not successful since the rise of temperature promotes the above mentioned reaction. Moreover, the reaction will lead to difficulty in controlling the properties of a polymer product including its molecular weight.

Thus, there has been a search for development of catalysts which eliminate the above described problems and can ensure production of polymers having high stereoregularity in an increased catalytic yield without using an electron donative compound as a third component (outside electron donor).

Japanese Patent Laid-Open Pub. No. 138715/1983 discloses a polymerization process using a catalyst which does not comprise an outside electron donor and is formed from a solid component and an organoaluminum compound, said solid component being obtained by reacting (1) a titanium complex comprising tetravalent titanium, magnesium, a halogen and, as an essential constituent, an electron donor with (2) an organosilicon compound having Si-O-C bond in the co-presence of an organoaluminum compound or by treating the titanium complex with an organoaluminum compound and then reacting the thus treated titanium complex with the organosilicon compound.

This process, however, contributes toward eliminating the problems mentioned above but leaves much to be desired, for example, limitations of the performance of the product polymer obtained, the deterioration of the catalyst with an elapse of time, and a limited range of ratios between the quantities of the titanium component and the organoaluminum compound used during polymerization.

SUMMARY OF THE INVENTION

An object of the present invention is to solve the above problems. More particularly, the present invention provide a catalyst for olefin polymerization which comprises:

Component (A) which is a solid catalyst component obtained by contacting the following components (i) to (iv):
(i) a solid component comprising titanium, magnesium and halogen as essential elements,
(ii) a silicon compound represented by the formula (I):

$$R^1{}_m X_n Si(OR^2)_{4-m-n} \qquad (I)$$

wherein $R^1$ and $R^2$ each represent a hydrocarbon residue (group), X represents a halogen, and each of m and n is an integer in the range of $0 \leq m \leq 3$, $0 \leq n \leq 3$, and $0 \leq m+n \leq 3$, (iii) a titanium compound or a silicon compound represented by the formula (II) or (III):

$$Ti(OR^3)_{4-l} X_l \qquad (II)$$

$$R^4{}_{4-l} SiX_l \qquad (III)$$

wherein $R^3$ represents a hydrocarbon residue (group), $R^4$ represents hydrogen or a hydrocarbon residue (group), X represents a halogen, and l is an integer in the range of $0 < l \leq 4$, and (iv) an organoaluminum compound; and Component (B) which is an organoaluminum compound.

MERITORIOUS EFFECTS OF THE INVENTION

The catalyst for olefin polymerization according to the present invention can ensure production of polymers having exceeding high stereoregularity in an improved yield without using an electron donative compound (outside electron donor) during polymerization.

Further, in the polymerization using the catalyst for olefin polymerization of the present invention, the problems associated with conventional catalysts such as reduction in polymerization rate and troubles accompanying an elevated polymerization temperature (approximately 75° to 90° C.) can be obviated.

These characteristic features of the catalyst of this invention are remarkably advantageous from the viewpoint of commercial production and represent important features of a catalyst. While the reasons such a catalyst could be obtained have not so far been fully analyzed, one possible reason may be attributable to the synergistic effect of the (i) solid component, (ii) silicon compound, (iii) titanium compound, and (iv) organoaluminum compound used in the present invention.

A still further feature of the catalysts of this invention is notably high catalytic activity. Even catalytic activity as high as about twice that of a catalyst heretofore known can be expected from the catalyst according to the present invention.

DETAILED DESCRIPTION OF THE INVENTION

Catalyst

The catalyst of the invention comprises a combination of Components (A) and (B). The wording "comprise a combination of" means the state where the components referred to are eventually comprised in it and does not mean that the process of the combination is necessarily conducted with respect to the components as such. The term also means not to exclude the combination of further components therewith.

Component (A)

Component (i):

Component (i) used for producing Component (A) in the invention is a solid component comprising titanium, magnesium and halogen as essential elements. The wording "comprising titanium, magnesium and halogen as essential elements" means substantial existence of these three elements, and it does not prescribe their existing form, nor exclude existence of additional components suitable for the purpose of the present invention. And also the manner to introduce these three elements is arbitrary. Accordingly, this solid catalyst component may contain other metal or metalloid elements as additional components or an electron donor compound as so-called "internal donor".

As mentioned above, solid component comprising these three elements as essential components are known. In the invention, any of the known solid components may be used. For example, there can be used solid components disclosed in Japanese patent application Laid-Open specifications No. 45,688/1978, No. 3,894/1979, No. 31,092/1979, No. 39,483/1979, No. 94,591/1979, No. 118,484/79, No. 131,589/1979, No. 75,411/1980, No. 90,510/1980, No. 90,511/1980, No. 127,405/1980, No. 147,507/1980, No. 155,003/1980, No. 18,609/1981, No. 70,005/1981, No. 72,001/1981, No. 86,905/1981, No. 90,807/1981, No. 155,206/1981, No. 3,803/1982, No. 34,103/1982, No. 92,007/1982, No. 121,003/1982, No. 5,309/1983, No. 5,310/1983, No. 5,311/1983, No. 8,706/1983, No. 27,732/1983, No. 32,604/1983, No. 32,605/1983, No. 67,703/1983, No. 117,206/1983, No. 127,708/1983, No. 183,708/1983, No. 183,709/1983, No. 149,905/1984 and No. 149,906/1984.

As the magnesium compound used as the magnesium source in the present invention, there can be mentioned a magnesium halide, a dialkoxy magnesium, as alkoxy magnesium halide, a magnesium oxyhalide, a dialkyl magnesium, magnesium oxide, magnesium hydroxide and a magnesium salt of a carboxylic acid. Among them, a magnesium halide is preferable.

As the titanium compound used as the titanium source, there can be mentioned compounds represented by the following formula:

$$Ti(OR^4)_{4-n}X_n$$

wherein $R^4$ stands for a hydrocarbon residue, preferably a hydrocarbon residue having 1 to about 10 carbon atoms, X stands for a halogen atom and n is a number of from 0 to 4.

As specific examples, there can be mentioned $TiCl_4$, $TiBr_4$, $Ti(OC_2H_5)Cl_3$, $Ti(OC_2H_5)_2Cl_2$, $Ti(OC_2H_5)_3Cl$, $Ti(O-i-C_3H_7)Cl_3$, $Ti(O-n-C_4H_9)Cl_3$, $Ti(O-n-C_4H_9)_2Cl_2$, $Ti(OC_2H_5)Br_3$, $Ti(OC_2H_5)$ $(OC_4H_9)_2Cl$, $Ti(O-n-C_4H_9)_3Cl$, $Ti(O-C_6H_5)Cl_3$, $Ti(O-i-C_4H_9)_2Cl_2$, $Ti(OC_5H_{11})Cl_3$, $Ti(OC_6H_{13})Cl_3$, $Ti(OC_2H_5)_4$, $Ti(O-n-C_3H_7)_4$, $Ti(O-n-C_4H_9)_4$, $Ti(O-i-C_4H_9)_4$, $Ti(O-n-C_6H_{13})_4$, $Ti(O-n-C_8H_{17})_4$ and $Ti[OCH_2CH(C_2H_5)C_4H_9]_4$.

Molecular compounds formed by reaction of $TiX'_4$ (in which X' stands for a halogen atom) with an electron donor can also be used. As specific examples, $TiCl_4\cdot CH_3COC_2H_5$, $TiCl_4\cdot CH_3CO_2C_2H_5$, $TiCl_4\cdot C_6H_5NO_2$, $TiCl_4\cdot CH_3COCl$, $TiCl_4\cdot C_6H_5COCl$, $TiCl_4\cdot C_6H_5CO_2C_2H_5$, $TiCl_4\cdot ClCOC_2H_5$ and $TiCl_4\cdot C_4H_4O$ can be mentioned.

Among these titanium compounds, $TiCl_4$, $Ti(OEt)_4$, $Ti(OBu)_4$ and $Ti(OBu)Cl_3$ are preferred. $TiCl_4$ and $Ti(OBu)_4$ are most preferred.

The halogen is ordinarily supplied by the abovementioned magnesium halide and/or titanium halide, but a known halogenating agent such as an aluminum halide, a silicon halide or a phosphorus halide may be used as the halogen source.

As the halogen contained in the solid catalyst component, there can be mentioned fluorine, chlorine, bromine, iodine and a mixture thereof, and chlorine is especially preferred.

In addition to the foregoing essential ingredients, the solid component used in the present invention can comprise another ingredient, for example, a silicon compound such as $SiCl_4$, $CH_3SiCl_3$, and methylhydrogen polysiloxane; and aluminum compound such as $Al(O-i-C_3H_8)_3$, $AlCl_3$, $AlBr_3$, $Al(OC_2H_5)_3$ and $Al(OCH_3)_2Cl$; or a boron compound such as $B(OC_6H_5)_3$, $B(OC_2H_5)_3$ and $B(OCH_3)_3$, and these ingredients can be left as the silicon, aluminum and boron ingredients in the solid catalyst component.

The solid component (i) can be prepared by using an electron donor compound as an internal electron donor.

As the electron donor (internal donor) used for the preparation of the solid component, there can be used oxygen-containing electron donors such as alcohols, phenols, ketones, aldehydes, carboxylic acids, esters of organic acids and inorganic acids, ethers, acid amides and acid anhydrides; and nitrogen-containing electron donors such as ammonia, amines, nitriles and isocyanates.

More specifically, there can be mentioned alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol and isopropylbenzyl alcohol; phenols having 6 to 25 carbon atoms, which can have an alkyl group, such as phenol, cresol, xylenol, ethylphenol, propylphenol, cumylphenol, nonylphenol and naphthol; ketones having 3 to 15 carbon atoms, such as acetone, methylethylketone, methylisobutylketone, acetophenone and benzophenone; aldehydes having 2 to 15 carbon atoms such as acetaldehyde, propionaldehyde, octylaldehyde, benzaldehyde, tolualdehyde and naphthaldehyde; esters of an organic acid having 2 to 20 carbon atoms such as methyl formate, methyl acetate, ethyl acetate, vinyl acetate, propyl acetate, octyl acetate, cyclohexyl acetate, ethyl propionate, methyl butyrate, ethyl valeate, ethyl stearate, methyl chloroacetate, ethyl dichloroacetate, methyl methacrylate, ethyl crotonate, ethyl cyclohexane-carboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, cumarine, phthalide, ethylene carbonate, cellosolve acetate, ethylcellosolve acetate, butylcellosolve acetate, cellosolve isobutyrate and cellosolve benzoate; esters of an inorganic acid such as ethyl silicate, butyl silicate, phenyltriethoxysilane and other silicic acid esters; acid halides having 2 to 15 carbon atoms such as acetyl chloride, benzoyl chloride, toluoyl chloride, anisoyl chloride, phthaloyl chloride and isophthaloyl chloride; ethers having 2 to 20 carbon atoms such as methyl ether, ethyl ether, isopropyl ether, butyl ether, amyl ether, tetrahydrofuran, anisole and diphenyl ether; acid amides such as acetic acid amide, benzoic acid amide and toluylic acid amide; amines such as methylamines, ethylamines, diethylamine, tributylamine, piperidine, tribenzylamine, aniline, pyridine, picoline and tetramethyl ethylene diamine; and nitriles such as acetonitrile, benzonitrile and tolunitrile. A mixture of two or more of these electron donors can be used.

The more preferable as the internal electron donor are esters of an organic acid or acid halides, and the most preferable are esters of phthalic acid, phthaloyl halides and cellosolve acetate.

The amounts used of the respective ingredients are not particularly critical, so far as the intended effects of the present invention are attained. However, the amounts described below are generally preferred.

The titanium compound is used in such an amount that the molar ratio to the amount used of the magnesium compound is $1 \times 10^{-4}$ to 1,000, preferably 0.01 to 10. When the halogenating agent is used, the molar ratio of the amount of the halogenating agent to the amount used of the magnesium compound is $1 \times 10^{-2}$ to 1,000, preferably 0.1 to 100, irrespective of whether or not the titanium compound and/or the magnesium compound contains a halogen. The amount used of the electron donor compound is such that the molar ratio to the amount used of the magnesium compound is $1 \times 10^{-3}$ to 10, preferably 0.01 to 5.

The amount used of each of the silicon, aluminum and boron compounds is such that the molar ratio to the amount used of the magnesium compound is $1 \times 10^{-3}$ to 100, preferably 0.01 to 1.

The solid component used in the present invention can be prepared according to known methods, preferably the methods described below. Specific examples of the compounds referred to in the following description are those as described above.

(a) A magnesium halide is contacted with a titanium-containing compound, and if necessary contacted with an electron donor.

(b) Alumina or magnesia is treated with a phosphorus halide compound and is then contacted with a magnesium halide, an electron donor and a halogen-containing titanium compound.

(c) A magnesium halide is contacted with a titanium tetra-alkoxide and a polymeric silicon compound and the obtained solid component is contacted with a halogen-containing titanium compound and/or a silicon halide and/or phosphorus chloride, if necessary, together with an electron donor. The polymeric silicon compound is represented by the following formula:

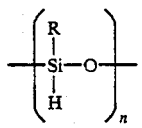

wherein R stands for a hydrocarbon residue having 1 to 10 carbon atoms and n is a degree of polymerization, which is preferably such that the polymer has a viscosity of 1 to 100 centistokes (cSt).

More particularly, mythylhydrogenpolysiloxane, ethylhydrogenpolysiloxane, phenylhydrogenpolysiloxane, cyclohexylhydrogenpolysiloxane, 1,3,5,7-tetramethylcyclotetrasiloxane, 1,3,5,7,9-pentamethylcyclopentasiloxane etc. are preferable.

(d) A magnesium compound is dissolved by means of a titanium tetra-alkoxide and an electron donor, a solid component is precipitated from the solution by a titanium- and halogen-compound or halogenating agent, and the solid component is contacted with a titanium compound.

(e) An organic magnesium compound such as a Grignard reagent is reacted with a halogenating agent and a reducing agent and the reaction product is contacted with an electron donor and a titanium compound.

(f) A magnesium alkoxide is contacted with a halogenating agent and/or a titanium compound in the presence or absence of an electron donor.

Thus, a solid component comprising titanium, magnesium and a halogen as essential ingredients is obtained.

The so-obtained solid component can be used directly as the solid component (i), and also a solid component obtained by contacting the so-obtained solid component with an olefin in the presence of an organoaluminum compound to effect a preliminary polymerization on it can be used as the component (i).

The conditions for the preliminary polymerization of the olefin for obtaining the component (i) are not particularly critical, but it is generally preferred that the preliminary polymerization be carried out under conditions: the polymerization temperature is 0° to 80° C., especially 10° to 60° C.; and the olefin is polymerized in an amount of 0.001 to 50 g, especially 0.1 to 10 g, per g of the solid component.

Any organoaluminum compounds known as a component in Ziegler-type catalysts can be used for the preliminary polymerization. For example, there can be mentioned $Al(C_2H_5)_3$, $Al(i-C_4H_9)_3$, $Al(C_6H_{13})_3$, $Al(C_8H_{17})_3$, $Al(C_{10}H_{21})_3$, $Al(C_2H_5)_2Cl$, $Al(i-C_4H_9)_2Cl$, $Al(C_2H_5)_2H$, $Al(i-C_4H_9)_2H$ and $Al(C_2H_5)_2(OC_2H_5)$.

Among these organoaluminum compounds, $Al(C_2H_5)_3$ and $Al(i-C_4H_9)_3$ are especially preferred. Furthermore, a combination of a trialkylaluminum and an alkylaluminum halide and a combination of a trialkylaluminum, an alkylaluminum halide and an alkylaluminum ethoxide are effective. For example, there can be mentioned a combination of $Al(C_2H_5)_3$ and $Al(C_2H_5)_2Cl$, a combination of $Al(i-C_4H_9)_3$ and $Al(i-C_4H_9)_2Cl$, a combination of $Al(C_2H_5)_3$ and $Al(C_2H_5)_{1.5}Cl_{1.5}$, and a combination of $Al(C_2H_5)_3$, $Al(C_2H_5)_2Cl$ and $Al(C_2H_5)_2(OC_2H_5)$.

The amount of the organoaluminum compound used for the preliminary polymerization to the amount of the Ti component in the solid catalyst Component (A) is such that the Al/Ti molar ratio is from 1 to 20, preferably from 2 to 10. At the preliminary polymerization, a known electron donor such as an alcohol, an ester or a ketone may be added in addition to the organoaluminum compound.

As the olefin used for the preliminary polymerization, there can be mentioned ethylene, propylene, 1-butene, 1-hexene and 4-methylpentene-1. Hydrogen may be present at the preliminary polymerization.

Component (ii):

The component (ii) for preparing the solid catalyst Component (A) of the present invention is a silicon compound represented by the following formula:

wherein $R^1$ and $R^2$ each stand for a hydrocarbon residue, X is a halogen atom, m is a number in the range of $0 \leq m \leq 3$, n is a number in the range of $0 \leq n \leq 3$, and $0 \leq m+n \leq 3$. $R^1$ and $R^2$ each are a hydrocarbon residue having 1 to 20 atoms, preferably 1 to 10 atoms. X is preferably chlorine from the economical point of view.

Specific examples of the component (ii) include: $(CH_3)Si(OCH_3)_3$, $(CH_3)Si(OC_2H_5)_3$, $(C_2H_5)_2Si(OCH_3)_2$, $(n-C_6H_{11})Si(OCH_3)_3$, $(C_2H_5)Si(OC_2H_5)_3$, $(n-C_{10}H_{21})Si(OC_2H_5)_3$, $(CH_2=CH)Si(OCH_3)_3$, $Cl(CH_2)_3Si(OCH_3)_3$, $Si(OCH_3)_4$, $Si(OC_2H_5)_3Cl$, $(C_2H_5)_2Si(OC_2H_5)_2$, $(C_{17}H_{35})Si(OCH_3)_3$, $Si(OC_2H_5)_4$, $(C_6H_5)Si(OCH_3)_3$, $Si(OCH_3)_2Cl_2$, $(C_6H_5)_2Si(OCH_3)_2$, $(C_6H_5)(CH_3)Si(OCH_3)_2$, $(C_6H_5)Si(OC_2H_5)_3$, $(C_6H_5)_2Si(OC_2H_5)_2$, $NC(CH_2)_2Si(OC_2H_5)_3$, $(C_6H_5)(CH_3)Si(OC_2H_5)_2$, $(n-C_3H_7)Si(OC_2H_5)_3$, $(CH_3)Si(OC_3H_7)_3$, $(C_6H_5)(CH_2)Si(OC_2H_5)_3$,

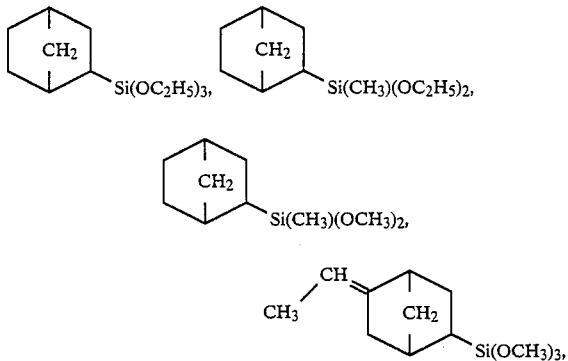

$(CH_3)_3CSi(CH_3)(OCH_3)_2$, $(CH_3)_3CSi(HC(CH_3)_2)(OCH_3)_2$, $(CH_3)_3CSi(CH_3)(OC_2H_5)_2$, $(C_2H_5)_3CSi(CH_3)(OCH_3)_2$, $(CH_3)(C_2H_5)CH-Si(CH_3)(OCH_3)_2$, $((CH_3)_2CHCH_2)Si(OCH_3)_2$, $C_2H_5C(CH_3)_2Si(CH_3)(OCH_3)_2$, $C_2H_5C(CH_3)_2Si(CH_3)(OC_2H_5)_2$, $(CH_3)_3CSi(OCH_3)_3$, $(CH_3)_3CSi(OC_2H_5)_3$, $(C_2H_5)_3CSi(OC_2H_5)_3$ and $(CH_3)(C_2H_5)CHSi(OCH_3)_3$.

Of these compounds, it is preferred that $R^1$ be a branched hydrocarbon residue having 3 to 20 carbon atoms in which the carbon atom at the α-position is a secondary or tertiary carbon atom. It is especially preferred that $R^1$ be a branched hydrocarbon residue with 4 to 10 carbon atoms in which the carbon atom at the α-position is a tertiary carbon atom. Most preferable compounds are $(CH_3)_3CSi(CH_3)(OCH_3)_2$, $(CH_3)_3CSi(CH_3)(OC_2H_5)_2$, $(CH_3)CSi(OCH_3)_3$, $(CH_3)CSi(OC_2H_5)_3$.

Component (iii):

The component (iii) for preparing the solid catalyst Component (A) is a titanium compound or silicon compound represented by the formula (II) or (III):

$$Ti(OR^3)_{4-l}X_l \quad (II)$$

$$R^4_{4-l}SiX_l \quad (III)$$

wherein $R^3$ represents a hydrocarbon residue, $R^4$ represents hydrogen or a hydrocarbon residue, X represents a halogen, and l is an integer in the range of $0 < l \leq 4$.

Specific examples of the titanium compound (II) include: $TiCl_4$, $TiBr_4$, $Ti(OC_2H_5)Cl_3$, $Ti(OC_2H_5)_2Cl_2$, $Ti(OC_2H_5)_3Cl$, $Ti(O-iC_3H_7)Cl_3$, $Ti(O-nC_4H_9)Cl_3$, $Ti(O-nC_4H_9)_2Cl_2$, $Ti(OC_2H_5)Br_3$, $Ti(OC_2H_5)(OC_4H_9)_2Cl$, $Ti(O-nC_4H_9)_3Cl$, $Ti(O-C_6H_5)Cl_3$, $Ti(O-iC_4H_9)_2Cl_2$, $Ti(OC_5H_{11})Cl_3$, and $Ti(OC_6H_{13})Cl_3$.

Among specific examples mentioned above, $TiCl_4$, $Ti(OC_2H_5)Cl_3$ and $Ti(OC_4H_9)Cl_3$ are especially preferable.

Specific examples of the silicon compound (III) include: $SiCl_4$, $CH_3SiCl_3$, $HSiCl_3$, $CH_3HSiCl_2$, $CH_2=CHSiCl_3$, $CH_3CHClSiCl_3$, $C_2H_5SiCl_3$, $(CH_3)_2SiCl_2$, $HSi(CH_3)_2Cl$, $C_3H_7SiCl_3$, $CH_3(C_2H_5)SiCl_2$, $SiBr_4$, $(CH_3)_3SiCl$, $CH_3(CH_2)_3SiCl_3$, $(C_2H_5)_2SiCl_2$, $CH_3(CH_2)_4SiCl_3$, $CH_3(CH_2)_3(CH_3)SiCl_2$, $(C_6H_5)SiCl_3$, $(C_6H_5)HSiCl_2$, $(cycloC_6H_{11})SiCl_3$, $(CH_2=CHCH)_2SiCl_2$, $CH_3(CH_2)_5SiCl_3$, $C_6H_5CH_2SiCl_3$, $(C_6H_5)(CH_3)SiCl_2$,

$CH_3(CH_2)_6SiCl_3$, $CH_3(CH_2)_5(CH_3)SiCl_2$, $(CH_3)(CH_2)_7SiCl_3$, $CH_3(CH_2)_6(CH_3)SiCl_2$, $(CH_3CH_2CH_2)_3SiCl$, $CH_3(CH_2)_9SiCl_3$, $CH_3(CH_2)_9(CH_3)SiCl_2$, and $(C_6H_5)_2SiCl_2$. Among them, $SiCl_4$, $(CH_3)SiCl_3$ and $(C_2H_5)SiCl_3$ are preferable.

Component (iv):

The component (iv) for preparing the solid catalyst Component (A) is an organoaluminum compound. Organoaluminum compounds which can be used for preparing the component (i) mentioned above are also able to use as the component (iv). Specific examples are $Al(C_2H_5)_3$, $Al(iC_4H_9)_3$, $Al(nC_4H_9)_3$, $Al(C_5H_{11})_3$, $Al(C_8H_{17})_3$, $Al(C_{10}H_{21})_3$, $Al(C_2H_5)Cl$, $Al(iC_4H_9)_2Cl$, $Al(C_2H_5)_2H$, $Al(iC_4H_9)_2H$, $Al(C_6H_{13})_3$ and $Al(C_2H_5)_2(OC_2H_5)$.

Preparation of Component (A):

The conditions for contacting the components (i), (ii), (iii) and (iv) are not particularly critical, so far as the intended effects of the present invention can be attained, but conditions described below are ordinarily preferred. The contact temperature is about $-50°$ to about $200°$ C., preferably $0°$ to $100°$ C. As the contacting method, there can be mentioned a mechanical method in which a rotary ball mill, a vibrating mill, a jet mill or a medium stirring pulverizer is used, and a method in which the contact is effected by stirring in the presence of an inert diluent. As the inert diluent, there can be mentioned an aliphatic or aromatic hydrocarbon and a halogenated hydrocarbon.

Specific examples for the contacting methods are as follows:

(a) component(i)+{component(ii)+component(iii)+component(iv)};
(b) component(i)+{component(iii)+component(iv)}+component(ii);
(c) component(i)+component(iii)+{component(ii)+component(iv)};
(d) component(i)+component(iii)+component(iv)+component(ii);
(e) component(i)+component(iv)+component(ii)+component(iii);
(f) component(i)+component(iv)+component(iii)+component(ii);
(g) component(i)+{component(ii)+component(iii)+component(iv)}+{component(ii)+component(iii)+component(iv)};

(h) component(i)+component(iii)+{component(ii)+-component(iv)}+}component(ii)+component(iv)}; and (i) component(i) +{component(ii)+component(iii)+-component(iv)}+{component(ii)+component(iv)}.

The amount of the components (i) to (iv) are not particularly critical, so far as the intended effects of the present invention can be attained, but conditions described below are ordinarily preferred.

The amounts of the components (i) and (ii) to be contacted with each other are such that the atomic ratio of silicon of the component (ii) to titanium of the component (i), silicon/titanium, is from 0.01 to 1,000, preferably from 0.1 to 100, more preferably from 0.2 to 10.

The amount of the component (iii) is such that the atomic ratio of titanium or silicon of the component (iii) to titanium of the component (i), i.e., titanium or silicon (component (iii)/titanium (component (i)), is from 0.01 to 100, preferably from 0.1 to 20.

The amount of the component (iv) is such that the atomic ratio of aluminum of the component (iv) to titanium of the component (i), i.e., aluminum/titanium, is from 0.01 to 100, preferably from 0.1 to 30.

Component (B)

The Component (B) is an organoaluminum compound. For examples, there can be used organoaluminum compounds represented by the following general formula:

$$R^5_{3-n}AlX_n \text{ or } R^6_{3-m}Al(OR^7)_m$$

wherein $R^5$ and $R^6$, which may be the same or different, each stand for a hydrocarbon residue having 1 to about 20 carbon atoms or a hydrogen atom, $R^7$ stands for a hydrocarbon residue, X stands for a halogen atom, n is a number of $0 \leq n < 3$, and m is a number of $0 < m < 3$. As specific examples, there can be mentioned (a) trialkylaluminum compounds such as trimethylaluminum, triethylaluminum, tri-isobutylaluminum tri-normalbutylaluminum, trihexylaluminum, trioctylaluminum and tridecylaluminum, (b) alkylaluminum halides such as diethylaluminum monochloride, di-isobutylaluminum monochloride, ethylaluminum sesquichloride and ethylaluminum dichloride, (c) alkylaluminum hydrides such as diethylaluminum hydride and di-isobutylaluminum hydride and (d) aluminum alkoxides such as diethylaluminum ethoxide and diethylaluminum phenoxide.

In combination with the organoaluminum compounds (a) through (c), there may be used other organometal compounds such as alkylaluminum alkoxides represented by the following formula:

$$R^8_{3-a}Al(OR^9)_a$$

wherein a is a number of $1 \leq a \leq 3$, and $R^8$ and $R^9$, which may be the same or different, each stand for a hydrocarbon residue having 1 to about 20 carbon atoms. For examples, there can be mentioned a combination of triethylaluminum and diethylaluminum ethoxide, a combination of diethylaluminum monochloride and diethylaluminum ethoxide, a combination of ethylaluminum dichloride and ethylaluminum diethoxide, and a combination of triethylaluminum, diethylaluminum ethoxide and diethylaluminum chloride.

The amount of the Component (B) is such that the ratio by weight, Component (B)/Component (A), is from 0.1 to 1000, preferably 1 to 100.

USE OF THE CATALYST/POLYMERIZATION

The catalyst of the present invention is used for not only slurry polymerization but also liquid phase solvent-free polymerization, solution polymerization or gas phase polymerization. Furthermore, the catalyst of the present invention can be used for continuous polymerization, batchwise polymerization or polymerization including preliminary polymerization.

In case of the slurry polymerization, there can be used as the polymerization solvent saturated aliphatic hydrocarbons and aromatic hydrocarbons such as hexane, heptane, cyclohexane, benzene, toluene and mixtures thereof. The polymerization temperature is room temperature to about 200° C., preferably 50° to 100° C., more preferably 60° to 90° C. Hydrogen can be used for adjusting the molecular weight of the polymer to be produced.

In case of the slurry polymerization, it is preferred that the amount of the Component (A) is within the range of from 0.0001 to 0.1 gram per 1 liter of the solvent.

The olefin polymerized by the catalyst system of the present invention is represented by the following general formula:

$$R-CH=CH_2$$

wherein R stands for a hydrogen atom or a hydrocarbon residue having 1 to 10 carbon atoms, which can have a branched group.

As specific examples, there can be mentioned ethylene, propylene, butene-1, pentene-1, hexene-1 and 4-methylpentene-1, and ethylene and propylene are preferred. Ethylene may be copolymerized with up to 50% by weight, preferably up to 20% by weight, of an olefin as described above, and propylene may be copolymerized with up to 30% by weight of an olefin as described above, especially ethylene. Furthermore, copolymerization with other copolymerizable monomer (for example, vinyl acetate or a diolefin) may be carried out. The catalyst according to the present invention is employed most suitably for homopolymerization of propyrene and copolymerization of ethylene and propylene.

EXPERIMENT

The present invention will now be described in detail with reference to the following examples that by no means limit the scope of the invention.

EXAMPLE 1

Preparation of Component (A)

A flask whose inside was sufficiently substituted by nitrogen was charged with 200 ml of dehydrated and deoxygenated n-heptane, and 0.4 mole of MgCl$_2$ and 0.8 mole of Ti(O-n-C$_4$H$_9$)$_4$ were introduced and reaction was carried out at 95° C. for 2 hours. After completion of the reaction, the temperature was lowered to 40° C. and 48 ml of methylhydropolysiloxane (20 cSt) was introduced. Reaction was carried out for 3 hours. The solid component formed was washed with n-heptane.

Then, in the same manner as above, a flask whose inside was sufficiently substituted by nitrogen was charged with 50 ml of purified n-heptane, and the solid component prepared as shown above was introduced in an amount of 0.24 mole as calculated as Mg. Then, a mixture of 25 ml of n-heptane and 0.4 mole and SiCl$_4$ was introduced into the flask at 30° C. over a period of 30 minutes and reaction was carried out at 70° C. for 3 hours. Then, a mixture of 25 ml of n-heptane and 0.016 mole of phthaloyl chloride was charged into the flask at 90° C. over a period of 30 minutes, and reaction was carried out at 90° C. for 1 hour.

After termination of the reaction, the reaction product was washed with n-heptane. Then, 20 ml of $SiCl_4$ was introduced into the flask and reaction was carried out at 80° C. for 6 hours. After completion of the reaction, the reaction product was sufficiently washed with n-heptane. The content of titanium in the obtained product was 1.21% by weight.

A flask whose inside was fully substituted by nitrogen was charged with 50 ml of purified n-heptane, and 5 g of the component (i) obtained was introduced and then, 0.40 ml of $(CH_3)_3CSi(CH_3)(OCH_3)_2$ as the silicon compound of the component (ii) was introduced. Further, 0.52 ml of $TiCl_4$ as the component (iii) and 1.5 g of triethyl aluminum as component (iv) were introduced, and contact was effected at 30° C. for 2 hours. After termination of the contact, the contact product was sufficiently washed with n-heptane to obtain Component (A).

Polymerization of Propylene

A stainless steel autoclave provided with a stirrer and a temperature-controlling device and having an inner volume of 1.5 liters was charged with 500 ml of sufficiently dehydrated and deoxygenated n-heptane, 100 mg of triethyl aluminum as the Component (B) and 10 mg of the above-mentioned Component (A).

Then, 60 ml of hydrogen was introduced into the autoclave, and the temperature and pressure were elevated. Polymerization of propylene was carried out under conditions of a polymerization pressure of 5 $Kg/cm^2G$, a polymerization temperature of 75° C. and a polymerization time of 2 hours. After termination of the polymerization, the polymer slurry obtained was separated by filtration, and the polymer was dried to obtain 211.3 g of a dry polymer. Separately, 0.45 g of a polymer was recovered from the filtrate. From the results of the boiling heptane extraction test, it was found that the total polymer I.I, which is hereinafter referred to as "T-I.I", was 99.3% by weight. MFR was 1.1 g/10 min and the bulk density of the polymer was 0.49 g/cc.

EXAMPLE 2

Preparation of Component (A)

A solid component was prepared in the same manner as described in Example 1 except that diheptyl phthalate was used instead of phthaloyl chloride and 25 ml of $TiCl_4$ was used instead of 20 ml of $SiCl_4$. The content of titanium in the obtained product was 2.33% by weight.

A flask whose inside was fully substituted by nitrogen was charged with 50 ml of purified n-heptane, and 5 g of the component (i) obtained was introduced and then, 0.36 ml of $(CH_3)_3CSi(CH_3)(OCH_3)_2$ as the silicon compound as the component (ii) was introduced. Further, 0.40 ml of $TiCl_4$ as the component (iii) and 2.5 g of triethyl aluminum as component (iv) were introduced, and contact was effected at 30° C. for 2 hours. After termination of the contact, the contact product was sufficiently washed with n-heptane to obtain Component (A).

Polymerization of Propylene

Polymerization was carried out under the same conditions as described in Example 1 except that the amount of triethyl aluminum of Component (B) was changed to 125 mg.

As the result, 223.7 g of a polymer was obtained, and MFR was 1.0 g/10 min, T-I.I was 99.1% by weight and the bulk density was 0.48 g/cc.

EXAMPLE 3

Preparation of Component (A)

A ball mill having a volume of 0.4 liter whose inside was sufficiently dried and was substituted by nitrogen was filled with 40 pieces of stainless steel balls having a diameter of 12 mm, and 20 g of $MgCl_2$ and 12.4 ml of diethyl phthalate were introduced into the ball mill and pulverized for 48 hours by the rotating ball mill. After completion of the pulverization, the mixed pulverized composition was taken out from the mill in a dry box, and 8.1 g of the pulverized composition was introduced into a sufficiently nitrogen-substituted flask and 25 ml of n-heptane and 25 ml of $TiCl_4$ were introduced into the flask. Reaction was carried out at 100° C. for 3 hours. After completion of the reaction, the reaction product was sufficiently washed with n-heptane. A part of the solid component (component (i)) obtained was sampled and analyzed, and it was found that the solid product has Ti content of 3.43% by weight.

A flask whose inside was fully substituted by nitrogen was charged with 50 ml of purified n-heptane, and 5 g of the component (i) obtained was introduced and then, 2.1 ml of diphenyldimethoxysilane as the silicon compound as the component (ii) was introduced. Further, 2.9 g of triisobutylaluminum as the component (iv) and 0.26 ml of $TiCl_4$ as the component (iii) were introduced. Contact was effected at 15° C. for 2 hours. After termination of the contact, the contact product was sufficiently washed with n-heptane to obtain Component (A).

Polymerization of Propylene

Polymerization was carried out under the same conditions as described in Example 1.

As the result, 91.7 g of a polymer was obtained, and MFR was 5.5 g/10 min, T-I.I was 97.9% by weight and the bulk density was 0.42 g/cc.

EXAMPLE 4

Preparation of Component (A)

A flask whose inside was sufficiently substituted by nitrogen was charged with 100 ml of dehydrated and deoxygenated n-heptane, and 0.1 mole of $MgCl_2$ and 0.2 mole of $Ti(O-n-C_4H_9)_4$ were introduced and reaction was carried out at 95° C. for 2 hours. After completion of the reaction, the temperature was lowered to 35° C. and 15 ml of 1,3,5,7-tetramethylcyclotetrasiloxane was introduced. Reaction was carried out for 5 hours. The solid component formed was washed with n-heptane.

Then, in the same manner as described in Example 1, a flask whose inside was sufficiently substituted by nitrogen was charged with 50 ml of purified n-heptane, and the solid component synthesized as shown above was introduced in an amount of 0.03 mole as calculated as Mg. Then, 0.06 mole of $SiCl_4$ was introduced into the flask at 20° C. over a period of 30 minutes and reaction was carried out at 50° C. for 3 hours.

After termination of the reaction, the reaction product was washed with n-heptane to obtain solid component (i) for preparing the Component (A). Ti content of the thus obtained component was 4.52 wt. %.

The component (i) was contacted with the component (ii) in the same manner as described in Example 1 except that 1.8 ml of $(CH_3)_3CSi(CH_3)(OC_2H_5)_2$ was used instead of $(CH_3)_3CSi(CH_3)(OCH_3)_2$ as the component (ii). After termination of the contact, the contact product was sufficiently washed with n-heptane to obtain Component (A).

Polymerization of Propylene

Polymerization was carried out under the same conditions as described in Example 1 except that the amount of the Component (A) was 15 mg and polymerization temperature was changed to 70° C.

As the result, 99 g of a polymer was obtained, and MFR was 6.3 g/10 min, T-I.I was 97.2% by weight and the bulk density was 0.49 g/cc.

EXAMPLE 5

A Component (A) was prepared under the same manner as described in Example 1 except that ethyl benzoate was used instead of phthaloyl chloride.

Polymerization of propylene was also carried out under the same conditions as described in Example 1.

As a result, 75.7 g of a polymer was obtained, MFR was 4.6 g/10 min, T-I.I was 95.5% by weight and the bulk density was 0.43 g/cc.

EXAMPLES 6 THROUGH 10

A component (A) was prepared in the same manner as described in Example 1 except that components (ii) and (iv) shown in Table 1 was used. Polymerization of propylene was also carried out under the same conditions as described in Example 1.

The results obtained are shown in Table 1.

EXAMPLE 11

Preparation of Component (A)

A component (i) was prepared in the same manner as described in Example 1.

A flask whose inside was sufficiently substituted by nitrogen was charged with 50 ml of dehydrated and deoxygenated n-heptane, 5 g of the component (i) obtained above, 0.25 ml of $(CH_3)_3CSi(CH_3)(OCH_3)_2$ as a silicon compound of the component (ii), 0.26 ml of $TiCl_4$ as the component (iii) and 1.5 g of triethylaluminum of the component (iv) were introduced respectively into the flask and contact was carried out at 30° C. for 1 hour. After termination of the contact, the contact product formed was washed with n-heptane.

Then, the contact product was further contacted with the above components (ii) to (iv) of the same amounts in the same manner as above. The product thus obtained was sufficiently washed with n-heptane to obtain Component (A).

Polymerization of Propylene

Polymerization was carried out under the same conditions as described in Example 1 except that a polymerization temperature was changed to 80° C.

As the result, 246.6 g of a polymer was obtained, and MFR was 1.0 g/10 min, T-I.I was 99.4% by weight and the bulk density was 0.50 g/cc.

EXAMPLE 12

Preparation of Component (A)

A component (i) was prepared in the same manner as described in Example 2.

Then, a stainless steel vessel provided with a stirrer and a temperature-controlling device and having an inner volume of 1.5 liters was charged with 500 ml of sufficiently dehydrated and deoxygenated n-heptane, 2.2 g of triethylaluminum and 20 g of the obtained solid component. While the temperature in the stirred vessel was maintained at 20° C., propylene was introduced at a constant rate and propylene was polymerized for 30 minutes. After termination of the polymerization, the reaction product was sufficiently washed with n-heptane. A part of the reaction product was sampled, the polymerized amount of propylene was examined and it was found that in the component (i) obtained, propylene was polymerized in an amount of 1.08 g per g of the solid component (i).

A flask whose inside was fully substituted by nitrogen was charged with 50 ml of purified n-heptane, and 5 g of the component (i) obtained was introduced and then, 3.0 g of triethyl aluminum as the component (iv) was introduced. Contact was effected at 30° C. for 1 hour.

Then, 0.25 ml of $(CH_3)_3CSi(CH_3)(OCH_3)_2$ as the component (ii) was introduced into the flask, and contact was effected at 40° C. for 1 hour. Thereafter, 0.35 ml of $TiCl_4$ as the component (iii) was introduced into the flask, and contact was effected at 30° C. for 1 hour. After termination of the contact, the contact product was sufficiently washed with n-heptane to obtain the Component (A).

Polymerization of Propylene

Polymerization was carried out under the same conditions as described in Example 1 except that the polymerization temperature was changed to 85° C.

As the result, 196.7 g of a polymer was obtained, and MFR was 1.2 g/10 min, T-I.I was 99.3% by weight and the bulk density was 0.46 g/cc.

EXAMPLES 13 AND 14

Polymerization was carried out for 6 hours with the use of the Component (A) prepared in Examples 1 and 11. Polymerization was carried out under the same conditions as described in Example 1 except that the amount of triethylaluminum of the Component (B) was changed to 80 mg and the amount of the Component (A) was changed to 7 mg. The results are shown in Table 2.

COMPARATIVE EXAMPLE 1

The Component (A) was prepared in the same manner as described in Example 1 except that $TiCl_4$ as the component (iii) was not used. Polymerization was carried out in the same manner.

As a result, 148.7 g of polymer was obtained, MFR was 1.9 g/10 min, T-I.I was 99.0% by weight and the bulk density was 0.46 g/cc.

COMPARATIVE EXAMPLE 2

Polymerization was carried out for 6 hours with the use of the Component (A) obtained in Comparative Example 1, under the same conditions as described in Example 13. The results are shown in Table 2.

TABLE 1

| Exam. No. | Si-compound in Component (ii) (Quantity) | Ti-compound in Component (iii) (Quantity) | Organo Al compound in Component (iv) (Quantity) | Polymer Yield (g) | T-I.I (wt. %) | MFR (g/10 min.) | Polymer bulk density (g/cc) |
|---|---|---|---|---|---|---|---|
| 6 | $(CH_3)_3CSi(OCH_3)_3$ (0.52 ml) | TiCl (0.56 ml) | Diethyl aluminum chloride (2.1 g) | 174.3 | 98.3 | 1.7 | 0.48 |
| 7 | $(CH_3)_3CSi(OC_2H_5)_3$ (0.58 ml) | $TiCl_4$ (0.26 ml) | Tri-n-octyl aluminum (2.4 g) | 164.6 | 98.0 | 1.8 | 0.48 |
| 8 | $(CH_3)_3CSi(CH_3)_2(OCH_3)$ (0.61 ml) | $Ti(OC_4H_9)Cl_3$ (1.1 ml) | Trimethyl aluminum (1.3 g) | 141.7 | 97.7 | 2.6 | 0.47 |
| 9 | 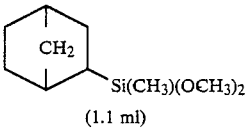 (1.1 ml) | $TiCl_4$ (0.52 ml) | Diethyl aluminum hydride (3.0 g) | 178.6 | 98.7 | 1.9 | 0.48 |
| 10 | 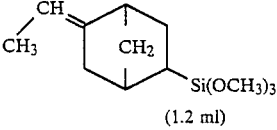 (1.2 ml) | $TiCl_4$ (1.1 ml) | Triethyl aluminum (4.5 g) | 166.3 | 98.0 | 2.3 | 0.47 |

TABLE 2

|  | Polymer Yield (g) | T-I.I (wt. %) | MFR (g/10 min.) | Polymer bulk density (g/cc) |
|---|---|---|---|---|
| Example 13 | 308.5 | 98.9 | 1.0 | 0.50 |
| Example 14 | 333.6 | 98.8 | 1.1 | 0.50 |
| Comparative Example 2 | 206.9 | 98.4 | 2.1 | 0.47 |

EXAMPLE 15

Preparation of Component (A)

A flask whose inside was sufficiently substituted by nitrogen was charged with 200 ml of dehydrated and deoxygenated n-heptane, and 0.4 mole of $MgCl_2$ and 0.8 mole of $Ti(O-n-C_4H_9)_4$ were introduced and reaction was carried out at 95° C. for 2 hours. After completion of the reaction, the temperature was lowered to 40° C. and 48 ml of methylhydropolysiloxane (20 cSt) was introduced. Reaction was carried out for 3 hours. The solid component formed was washed with n-heptane.

Then, in the same manner as above, a flask whose inside was sufficiently substituted by nitrogen was charged with 50 ml of purified n-heptane, and the solid component prepared as shown above was introduced in an amount of 0.24 mole as calculated as Mg. Then, a mixture of 25 ml of n-heptane and 0.4 mole of $SiCl_4$ was introduced into the flask at 30° C. over a period of 30 minutes a reaction was carried out at 70° C. for 3 hours. Then, a mixture of 25 ml of n-heptane and 0.016 mole of phthaloyl chloride was charged into the flask at 70° C. over a period of 30 minutes, and reaction was carried out at 90° C. for 1 hour.

After termination of the reaction, the reaction product was washed with n-heptane. Then, 2 ml of $SiCl_4$ was introduced into the flask and reaction was carried out at 80° C. for 6 hours. After completion of the reaction, the reaction product was sufficiently washed with n-heptane. The content of titanium in the obtained product was 1.96% by weight.

A flask whose inside was fully substituted by nitrogen was charged with 50 ml of purified n-heptane, and 5 g of the component (i) obtained was introduced and then, 0.40 ml of $(CH_3)_3CSi(CH_3)(OCH_3)_2$ as the silicon compound as the component (ii) was introduced. Further, 0.36 ml of $SiCl_4$ as the component (iii) and 2.5 g of triethyl aluminum as component (iv) were introduced. The contact was effected at 30° C. for 2 hours. After termination of the contact, the contact product was sufficiently washed with n-heptane to obtain Component (A).

Polymerization of Propylene

A stainless steel autoclave provided with a stirrer and a temperature-controlling device and having an inner volume of 1.5 liters was charged with 500 ml of sufficiently dehydrated and deoxygenated n-heptane, 100 mg of triethyl aluminum as the Component (B) and 10 mg of the above-mentioned Component (A).

Then, 60 ml of hydrogen was introduced into the autoclave, and the temperature and pressure were elevated. Polymerization of propylene was carried out under conditions of a polymerization pressure of 5 $Kg/cm^2G$, a polymerization temperature of 75° C. and a polymerization time of 2 hours. After termination of the polymerization, the polymer slurry obtained was separated by filtration, and the polymer was dried to obtain 178.6 g of a dry polymer. Separately, 0.43 g of a polymer was recovered from the filtrate. From the results of the boiling heptane extraction test, it was found that the total polymer I.I, which is hereinafter referred to as "T-I.I", was 99.2% by weight. MFR was 1.3 g/10 min and the bulk density of the polymer was 0.49 g/cc.

EXAMPLE 16

Preparation of Component (A)

A solid component was prepared in the same manner as described in Example 15 except that diheptyl phthalate was used instead of phthaloyl chloride and 10 ml of $TiCl_4$ was used instead of 12 ml of $SiCl_4$. The content of titanium in the obtained product was 2.68% by weight.

A flask whose inside was fully substituted by nitrogen was charged with 50 ml of purified n-heptane, and 5 g of the component (i) obtained was introduced and then, 0.52 ml of $SiCl_4$ as the silicon compound of the component (iii) was introduced. Contact was effected at 80° C. for 2 hours.

After termination of the contact, 0.36 ml of (CH$_3$)$_3$CSi(CH$_3$)(OCH$_3$)$_2$ as the component (ii) and 1.8 g of triethylaluminum as the component (iv) were introduced. Contact was effected at 40° C. for 1 hour.

Polymerization of Propylene

Polymerization was carried out under the same conditions as described in Example 15 except that the amount of triethyl aluminum of Component (B) was changed to 125 mg.

As the result, 191.2 g of a polymer was obtained, and MFR was 1.3 g/10 min, T-I.I was 99.2% by weight and the bulk density was 0.47 g/cc.

EXAMPLE 17

Preparation of Component (A)

A ball mill having a volume of 0.4 liter whose inside was sufficiently dried and was substituted by nitrogen was filled with 40 pieces of stainless steel balls having a diameter of 12 mm, and 20 g of MgCl$_2$ and 12.4 ml of diethyl phthalate were introduced into the ball mill and pulverized for 48 hours by the rotating ball mill. After completion of the pulverization, the mixed pulverized composition was taken out from the mill in a dry box, and 8.1 g of the pulverized composition was introduced into a sufficiently nitrogen-substituted flask and 25 ml of n-heptane and 25 ml of TiCl$_4$ were introduced into the flask. Reaction was carried out at 100° C. for 3 hours. After completion of the reaction, the reaction product was sufficiently washed with n-heptane. A part of the solid component (component (i)) obtained was sampled and analyzed, and it was found that the solid product has Ti content of 3.43% by weight.

A flask whose inside was fully substituted by nitrogen was charged with 50 ml of purified n-heptane, and 5 g of the component (i) obtained was introduced and then, 2.1 ml of diphenyldimethoxysilane as the silicon compound of the component (ii) was introduced. Further, 3.4 g of triisobutylaluminum as the component (iv) and 0.36 ml of SiCl$_4$ as the component (iii) were introduced. Contact was effected at 15° C. for 2 hours. After termination of the contact, the contact product was sufficiently washed with n-heptane to obtain Component (A).

Polymerization of Propylene

Polymerization was carried out under the same conditions as described in Example 15.

As the result, 86.6 g of a polymer was obtained, and MFR was 6.5 g/10 min, T-I.I was 97.8% by weight and the bulk density was 0.43 g/cc.

EXAMPLE 18

Preparation of Component (A)

A flask whose inside was sufficiently substituted by nitrogen was charged with 100 ml of dehydrated and deoxygenated n-heptane, and 0.1 mole of MgCl$_2$ and 0.2 mole of Ti(O-n-C$_4$H$_9$)$_4$ were introduced and reaction was carried out at 95° C. for 2 hours. After completion of the reaction, the temperature was lowered to 35° C. and 15 ml of 1,3,5,7-tetramethylcyclotetrasiloxane was introduced. Reaction was carried out for 5 hours. The solid component formed was washed with n-heptane.

Then, in the same manner as described in Example 15, a flask whose inside was sufficiently substituted by nitrogen was charged with 50 ml of purified n-heptane, and the solid component synthesized as shown above was introduced in an amount of 0.03 mole as calculated as Mg. Then, 0.06 mole of SiCl$_4$ was introduced into the flask at 20° C. over a period of 30 minutes and reaction was carried out at 50° C. for 3 hours. After termination of the reaction, the reaction product was washed with n-heptane to obtain solid component (i) for preparing the Component (A). Ti content of the thus obtained component was 4.52 wt. %.

The component (i) was contacted with the component (ii) in the same manner as described in Example 15 except that 1.8 ml of (CH$_3$)$_3$CSi(CH$_3$)(OC$_2$H$_5$)$_2$ was used instead of (CH$_3$)$_3$CSi(CH$_3$)(OCH$_3$)$_2$ as the component (ii). After termination of the contact, the contact product was sufficiently washed with n-heptane to obtain Component (A).

Polymerization of Propylene

Polymerization was carried out under the same conditions as described in Example 15 except that the amount of the Component (A) was 15 mg and polymerization temperature was changed to 70° C.

As the result, 91 g of a polymer was obtained, and MFR was 6.3 g/10 min, T-I.I was 97.3% by weight and the bulk density was 0.49 g/cc.

EXAMPLE 19

A Component (A) was prepared under the same manner as described in Example 15 except that ethyl benzoate was used instead of phthaloyl chloride.

Polymerization of propylene was also carried out under the same conditions as described in Example 15.

As a result, 70.6 g of a polymer was obtained, MFR was 4.8 g/10 min, T-I.I was 96.0% by weight and the bulk density was 0.44 g/cc.

EXAMPLES 20 THROUGH 24

A Component (A) was prepared in the same manner as described in Example 15 except that components (ii) and (iv) shown in Table 3 were used. Polymerization of propylene was also carried out under the same conditions as described in Example 15.

The results obtained are shown in Table 3.

TABLE 3

| Exam. No. | Si-compound in Component (ii) (Quantity) | Si-compound in Component (iii) (Quantity) | Organo Al compound in Component (iv) (Quantity) | Polymer Yield (g) | T-I.I (wt. %) | MFR (g/10 min.) | Polymer bulk density (g/cc) |
|---|---|---|---|---|---|---|---|
| 20 | (CH$_3$)$_3$CSi(OCH$_3$)$_3$ (0.48 ml) | (CH$_3$)SiCl$_3$ (0.40 ml) | Diethyl aluminum chloride (2.3 g) | 166.2 | 98.4 | 1.8 | 0.48 |
| 21 | (CH$_3$)$_3$CSi(OC$_2$H$_5$)$_3$ (0.62 ml) | (C$_2$H$_5$)SiCl$_3$ (0.46 ml) | Tri-n-octyl aluminum (2.6 g) | 157.4 | 98.1 | 1.9 | 0.47 |
| 22 | (CH$_3$)$_3$CSi(CH$_3$)$_2$(OCH$_3$) | (CH$_3$)$_2$SiCl$_2$ | Trimethyl aluminum | 140.6 | 97.6 | 2.7 | 0.46 |

TABLE 3-continued

| Exam. No. | Si-compound in Component (ii) (Quantity) | Si-compound in Component (iii) (Quantity) | Organo Al compound in Component (iv) (Quantity) | Polymer Yield (g) | T-I.I (wt. %) | MFR (g/10 min.) | Polymer bulk density (g/cc) |
|---|---|---|---|---|---|---|---|
|  | (0.64 ml) | (0.80 ml) | (1.4 g) |  |  |  |  |
| 23 | cyclohexyl-CH$_2$-Si(CH$_3$)(OCH$_3$)$_2$ (1.3 ml) | SiCl$_4$ (0.43 ml) | Diethyl aluminum hydride (3.0 g) | 167.3 | 98.7 | 1.8 | 0.48 |
| 24 | (CH$_3$)(CH$_3$)CH-cyclohexyl-CH$_2$-Si(OCH$_3$)$_3$ (1.4 ml) | SiCl$_4$ (0.55 ml) | Triethyl aluminum (4.5 g) | 156.2 | 98.1 | 2.4 | 0.48 |

EXAMPLE 25

Preparation of Component (A)

A component (i) was prepared in the same manner as described in Example 15.

A flask whose inside was sufficiently substituted by nitrogen was charged with 50 ml of dehydrated and deoxygenated n-heptane, 5 g of the component (i) obtained above, 0.28 ml of (CH$_3$)$_3$CSi(CH$_3$)(OCH$_3$)$_2$ as a silicon compound of the component (ii), 0.23 ml of SiCl$_4$ as the component (iii) and 1.6 g of triethylaluminum of the component (iv) were introduced respectively into the flask and contact was carried out at 30° C. for 1 hour. After termination of the contact, the contact product formed was washed with n-heptane.

Then, the contact product was further contacted with the above components (ii) to (iv) of the same amounts in the same manner as above, followed by washing with n-heptane to obtain Component (A).

Polymerization of Propylene

Polymerization was carried out under the same conditions as described in Example 15 except that a polymerization temperature was changed to 80° C.

As the result, 199.8 g of a polymer was obtained, and MFR was 1.1 g/10 min, T-I.I was 99.4% by weight and the bulk density was 0.49 g/cc.

EXAMPLE 26

Preparation of Component

A component (i) was prepared in the same manner as described in Example 16.

Then, a stainless steel vessel provided with a stirrer and a temperature-controlling device and having an inner volume of 1.5 liters was charged with 500 ml of sufficiently dehydrated and deoxygenated n-heptane, 2.2 g of triethylaluminum and 20 g of the obtained solid component. While the temperature in the stirred vessel was maintained at 20° C., propylene was introduced at a constant rate and propylene was polymerized for 30 minutes. After termination of the polymerization, the reaction product was sufficiently washed with n-heptane. A apart of the reaction product was sampled, the polymerized amount of propylene was examined and it was found that in the component (i) obtained, propylene was polymerized in an amount of 1.10 g per g of the solid component.

A flask whose inside was fully substituted by nitrogen was charged with 50 ml of purified n-heptane, and 5 g of the component (i) obtained was introduced and then, 0.28 g of (CH$_3$)$_3$CSi(CH$_3$)(OCH$_3$)$_2$ as the component (ii) was introduced. Then, 0.38 ml of SiCl$_4$ as the component (iii) was introduced, and contact was effected at 30° C. for 1 hour. After termination of the contact, the contact product was sufficiently washed with n-heptane to obtain Component (A).

Polymerization of Propylene

Polymerization was carried out under the same conditions as described in Example 15 except that a polymerization temperature was changed to 85° C.

As the result, 177.3 g of a polymer was obtained, and MFR was 1.3 g/10 min, T-I.I was 99.2% by weight and the bulk density was 0.45 g/cc.

EXAMPLES 27 AND 28

Polymerization was carried out for 6 hours with the use of the Component (A) prepared in Example 15 and 25. Polymerization was carried out under the same conditions as described in Example 15 except that the amount of triethylaluminum of the Component (B) was changed to 80 mg and the amount of the Component (A) was changed to 7 mg. The results are shown in Table 4.

COMPARATIVE EXAMPLE 3

The Component (A) was prepared in the same manner as described in Example 15 except that SiCl$_4$ as the component (iii) was not used. Polymerization was carried out in the same manner as described in Example 15 except that the Component (A) obtained above was used.

As a result, 151.6 g of a polymer was obtained, MFR was 1.9 g/10 min, T-I.I was 99.0% by weight and the bulk density was 0.45 g/cc.

COMPARATIVE EXAMPLE 4

Polymerization was carried out for 6 hours with the use of the Component (A) obtained in Comparative Example 3, under the same conditions as described Example 27. The results are shown in Table 4.

TABLE 4

| | Polymer Yield (g) | T-I.I (wt. %) | MFR (g/10 min.) | Polymer bulk density (g/cc) |
|---|---|---|---|---|
| Example 27 | 239.6 | 98.7 | 1.1 | 0.49 |
| Example 28 | 256.9 | 98.8 | 1.2 | 0.49 |
| Comparative Example 4 | 191.7 | 98.4 | 2.0 | 0.47 |

What is claimed is:

1. A catalyst for olefin polymerization which comprises a component (A) and a component (B), wherein:
component (A) is a solid catalyst component obtained by contacting together the following components (i) to (iv):
(i) a solid component comprising titanium, magnesium and halogen as essential elements, and which is obtained by contacting a magnesium halide with a titanium compound represented by the formula $Ti(OR^4)_{4-n}X_n$ wherein $R^4$ stands for a hydrocarbon residue having 1 to 10 carbon atoms, X stands for a halogen atom and n is a number of from 0 to 4;
(ii) a silicon compound represented by the formula (I):

$$R^1{}_m X_n Si(OR^2)_{4-m-n} \qquad (I)$$

wherein $R^1$ and $R^2$ each represent a hydrocarbon residue, X represents a halogen, and each of m and n is an integer in the range of $0 \leq m \leq 3$, $0 \leq n \leq 3$, and $0 \leq m+n \leq 3$,
(iii) a titanium compound or a silicon compound represented by the formula (II) or (III):

$$Ti(OR^3)_{4-l}X_l \qquad (II)$$

$$R^4{}_{4-l}SiX_l \qquad (III)$$

wherein $R^3$ represents a hydrocarbon residue, $R^4$ represents hydrogen or a hydrocarbon residue, X represents a halogen, and l is an integer in the range of $0 < l \leq 4$, and
(iv) an organoaluminum compound; and
component (B) is an organoaluminum compound.

2. The catalyst according to claim 1, wherein, in the solid component (i), said magnesium halide is contacted with said titanium compound and with one additional compound selected from the group consisting of silicon compounds, aluminum compounds, boron compounds, electron donor compounds, and mixtures thereof.

3. The catalyst according to claim 1, wherein the titanium contained in the solid component (i) is supplied from $TiCl_4$, $Ti(OEt)_4$, $Ti(OBu)_4$ or $Ti(OBu)Cl_3$.

4. The catalyst according to claim 1, wherein the solid component (i) is prepared using an electron donor compound.

5. The catalyst according to claim 4, wherein the electron donor compound is an ester of a carboxylic acid or acyl halide.

6. The catalyst according to claim 1, wherein the solid component (i) is one which has undergone a preliminary polymerization in which an olefin is polymerized thereover in the presence of an organoaluminum compound.

7. The catalyst according to claim 1, wherein $R^1$ in the formula (I) is a branched hydrocarbon residue with 4 to 10 carbon atoms in which the carbon atom at the α-position is a tertiary carbon atom.

8. The catalyst according to claim 1, wherein the titanium compound of the formula (II) is selected from the group consisting of $TiCl_4$, $TiBr_4$, $Ti(OC_2H_5)Cl_3$, $Ti(OC_2H_5)_2Cl_2$, $Ti(OC_2H_5)_3Cl$, $Ti(O-iC_3H_7)Cl_3$, $Ti(O-nC_4H_9)Cl_3$, $Ti(O-nC_4H_9)_2Cl_2$, $Ti(OC_2H_5)Br_3$, $Ti(OC_2H_5)(OC_4H_9)_2Cl$, $Ti(O-nC_4H_9)_3Cl$, $Ti(O-C_6H_5)Cl_3$, $Ti(O-iC_4H_9)_2Cl_2$, $Ti(OC_5H_{11})Cl_3$, and $Ti(OC_6H_{13})Cl_3$.

9. The catalyst according to claim 8, wherein the titanium compound is $TiCl_4$, $Ti(OC_2H_5)Cl_3$ or $Ti(OC_4H_9)Cl_3$.

10. The catalyst according to claim 1, wherein the silicon compound of the formula (III) is selected from the group consisting of $SiCl_4$, $CH_3SiCl_3$, $HSiCl_3$, $CH_3HSiCl_2$, $CH_2=CHSiCl_3$, $CH_3CHClSiCl_3$, $C_2H_5SiCl_3$, $(CH_3)_2SiCl_2$, $HSi(CH_3)_2Cl$, $C_3H_7SiCl_3$, $CH_3(C_2H_5)SiCl_2$, $SiBr_4$, $(CH_3)_3SiCl$, $CH_3(CH_2)_3SiCl_3$, $(C_2H_5)_2SiCl_2$, $CH_3(CH_2)_4SiCl_3$, $CH_3(CH_2)_3(CH_3)SiCl_2$, $(C_6H_5)SiCl_3$, $(C_6H_5)HSiCl_2$, $(cycloC_6H_{11})SiCl_3$, $(CH_2=CHCH)_2SiCl_2$, $CH_3(CH_2)_5SiCl_3$, $C_6H_5CH_2SiCl_3$, $(C_6H_5)(CH_3)SiCl_2$,

$CH_3(CH_2)_6SiCl_3$, $CH_3(CH_2)_5(CH_3)SiCl_2$, $(CH_3)(CH_2)_7SiCl_3$, $CH_3(CH_2)_6(CH_3)SiCl_2$, $(CH_3CH_2CH_2)_3SiCl$, $CH_3(CH_2)_9SiCl_3$, $CH_3(CH_2)_9(CH_3)SiCl_2$, and $(C_6H_5)_2SiCl_2$.

11. The catalyst according to claim 10, wherein the silicon compound is $SiCl_4$, $(CH_3)SiCl_3$ or $(C_2H_5)SiCl_3$.

12. The catalyst according to claim 1, wherein the organoaluminum compound of the component (iv) is selected from the group consisting of $Al(C_2H_5)_3$, $Al(iC_4H_9)_3$, $Al(nC_4H_9)_3$, $Al(C_5H_{13})_3$, $Al(C_8H_{17})_3$, $Al(C_{10}H_{21})_3$, $Al(C_2H_5)Cl$, $Al(iC_4H_9)_2Cl$, $Al(C_2H_5)_2H$, $Al(iC_4H_9)_2H$ and $Al(C_2H_5)_2(OC_2H_5)$.

13. The catalyst according to claim 1, wherein the amount of the component (ii) is such that the atomic ratio of silicon of the component (ii) to titanium of the component (i) is from 0.01 to 1,000.

14. The catalyst according to claim 1, wherein the amount of the component (iii) is such that the atomic ratio of titanium or silicon of the component (iii) to titanium of the component (i) is from 0.01 to 100.

15. The catalyst according to claim 1, wherein the amount of the component (iv) is such that the atomic ratio of aluminum of the component (iv) to titanium of the component (i) is from 0.01 to 100.

16. The catalyst according to claim 1, wherein the amount of the Component (B) to that of the Component (A) is from 0.1 to 1,000.

* * * * *